June 5, 1973 D. B. KECK ET AL 3,737,292

METHOD OF FORMING OPTICAL WAVEGUIDE FIBERS

Filed Jan. 3, 1972

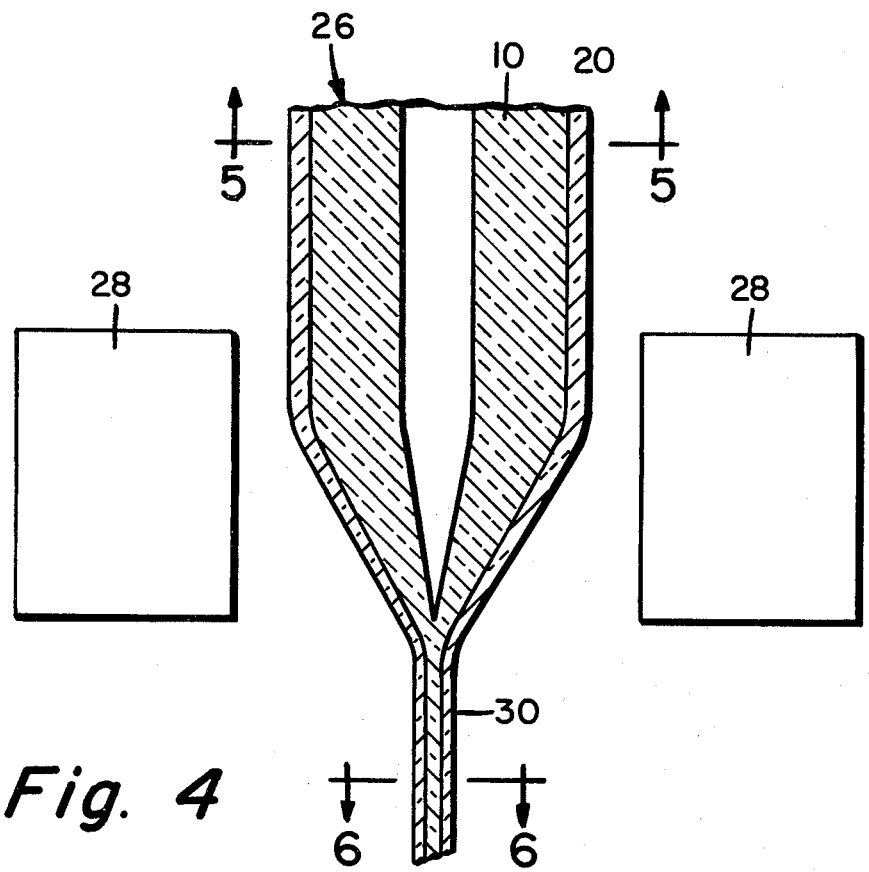
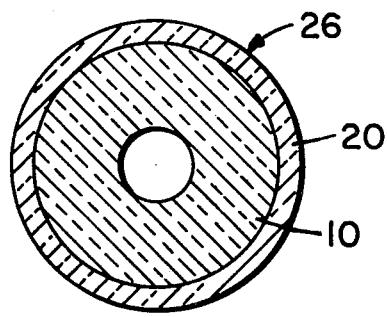
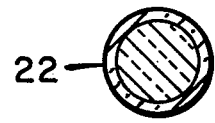

3,737,292
METHOD OF FORMING OPTICAL WAVEGUIDE FIBERS
Donald B. Keck, Big Flats, Peter C. Schultz, Painted Post, and Frank Zimar, Hammondsport, N.Y., assignors to Corning Glass Works, Corning, N.Y.
Filed Jan. 3, 1972, Ser. No. 214,841
Int. Cl. C03c 25/06
U.S. Cl. 65—3
17 Claims

ABSTRACT OF THE DISCLOSURE

A method of forming an optical waveguide by forming a first coating of glass having a predetermined index of refraction on the outside peripheral wall surface of a substantially cylindrical starter rod or member. Thereafter, a second coating of glass is applied to the peripheral outside surface of the first coating, said second coating having a preselected index of refraction less than the index of refraction of the first coating. The starter rod or member is removed from the assembly following the application of either the first or second coating. The resulting substantially cylindrical hollow assembly is heated and drawn to reduce the cross-sectional area and to collapse the first and inner coating of glass to form a fiber having a solid cross-sectional area. The collapsed first and inner coating forms the fiber core and the second coating forms the cladding for the fiber.

BACKGROUND OF THE INVENTION

(I) Field of the invention

Waveguides used in optical communications systems are herein referred to as "optical waveguides" and are normally constructed from a transparent dielectric material such as glass or plastic.

It is well known to one skilled in the art that light can be caused to propagate along a transparent fiber structure which has a higher refractive index than its surroundings. The ordinary use of such optical fibers is to transmit a signal or an image, that is light which has been modulated in some form, from one point to another. To be effective, optical fibers produced for these purposes must avoid excessive attenuation of the transmitted light usually resulting from one or more causes such as scattering, absorption or the like. Further, to be an effective transmitting media for an optical communications system, an optical waveguide should not only transmit light without excessive attenuation, but should allow only preselected modes of light to propagate along the fiber, and should be constructed to minimize cross-talk from adjacent waveguides and minimize mode dispersion.

Operational theories and other pertinent information concerning optical waveguides may be found in U.S. Pat. No. 3,157,726 issued to Hicks et al.; in the publication entitled "Cylindrical Dielectric Waveguide Mode" by E. Snitzer, Journal of the Optical Society of America, vol. 51, No. 5, pages 491–498, May 1961; and in "Fiber Optics Principles and Applications" by N. S. Kapany, Academic Press (1967).

The propagation of light waves is governed by the same laws of physics that govern microwave propagation and, therefore, can also be studied in terms of modes. Since each mode of light traveling along a glass fiber structure propagates at its own inherent velocity, it can be shown that information initially supplied to all modes will be dispersed after traversing a given length of fiber due to different propagation velocities. If light propagation along an optical fiber could be restricted to preselected modes, clearly more effective information transmission would result. Producing a satisfactory optical waveguide has been one of the more difficult problems in the development of an effective optical communications system.

(II) Description of the prior art

A method heretofore used for producing an optical fiber is described as follows. A rod of glass possessing the desired core characteristics was inserted into a tube of glass possessing the desired cladding characteristics. The temperature of this combination was then raised until the viscosity of the materials was low enough for drawing. The combination was then drawn until the tube collapsed around and fused to the inside rod. The resulting combination rod was then further drawn until its cross-sectional area was decreased to the desired dimensions. During the drawing process, the rod and tube would normally be fed at different speeds to attempt to produce a fiber with the desired core to cladding diameter ratio. This method, however, has been sometimes unsatisfactory because of the particular difficulty in maintaining the core and cladding dimensions. Further "residual water" in ordinarily produced glass causes absorptive attenuation. By residual water in glass is meant that the glass contains a high level of OH radical. An explanation of "residual water" may be found in U.S. Pat. No. 3,531,271 to W. H. Dumbaugh, Jr. An additional problem is that numerous tiny air bubbles and foreign particles are often trapped at the core and cladding interface and become a source of light scattering centers. In addition, the core and cladding materials of any waveguide must be selected so that there is a precise difference between the two indices of refraction. Glass tubes and glass rods which simultaneously have precise differences in their indices of refraction, low OH radical content, similar coefficients of expansion and similar viscosities are not readily available. Variations in core diameter or in either index of refraction may significantly affect the transmission characteristics of a waveguide.

Another method of forming an optical waveguide is described in U.S. patent application Ser. No. 36,267, filed May 11, 1970 by D. B. Keck and P. C. Schultz and is assigned to a common assignee. That patent application teaches a method of producing an optical waveguide wherein a single film of material is applied to the inside surface of a tube with the composite structure thereafter being heated and drawn to form a waveguide fiber.

SUMMARY OF THE INVENTION

It is an object of the present invention to provide an optical waveguide and a method for economically producing it which overcome the heretofore noted disadvantages.

Other objects of the present invention are to provide a method for producing an optical waveguide that will not cause excessive light absorption losses, that will not cause excessive dispersion in the transmitted light, that will minimize cross-talk between adjacent fibers, that has a low OH radical content, that does not have light scattering centers at the core and cladding interface, and that has an otherwise improved interface.

Broadly, according to this invention an optical waveguide is produced by applying a first coating of material to the outside peripheral surface of a substantially cylindrical glass or other material starting member. Thereafter a second coating of glass is applied to the peripheral outside surface of the first coating, the second coating having a preselected index of refraction less than the index of refraction of the first coating. The starting rod or member is removed from the assembly following the application of either the first or second coating. The resulting substantially cylindrical hollow assembly is then either maintained at or heated to a temperature at which the materials have a low enough viscosity for drawing and is drawn to reduce the diameter thereof until the first and inner coating of glass is collapsed, that is the longitudinal hole is sealed and a solid rod surrounded by the second coating of glass is formed. Thereafter, continued drawing of the composite structure further reduces the diameter thereof to form a glass optical fiber which possesses the characteristics of the desired optical waveguide. That is, it transmits preselected modes of light without excessive attenuation or absorption losses, minimizes cross-talk between adjacent optical waveguides, does not cause excessive dispersion of the transmitted light, and provides an improved cladding-core interface.

These and additional objects, features and advantages of the present invention will become apparent to those skilled in the art from the following detailed description and the attached drawing, on which, by way of example, only the preferred embodiments of this invention are illustrated.

BRIEF DESCRIPTION OF THE DRAWINGS

FIG. 4 is a fragmentary elevation partly in cross-section of an optical fiber being formed.

FIG. 5 is a cross section taken along line 5—5 of FIG. 4.

FIG. 6 is a cross section taken along line 6—6 of FIG. 4.

DETAILED DESCRIPTION OF THE INVENTION

It is to be noted that the drawings are illustrative and symbolic of the invention and there is no intention to indicate the scale or relative proportions of the elements shown therein.

Figure 1:
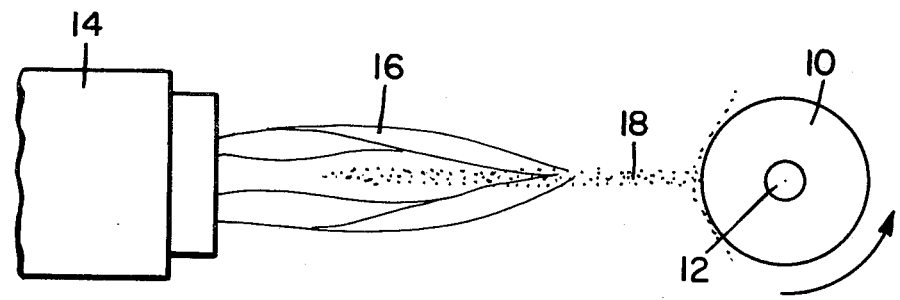
FIG. 1 is an illustration of a means of applying a coating to the outside of a starting member.

One method of forming a clad optical fiber suitable for use as an optical waveguide is illustrated in the drawings. Referring to FIG. 1, a coating 10 of glass is applied to a substantially cylindrical glass starting member or rod 12 by means of a flame hydrolysis burner 14. Burner 14 emits flame 16 in which a gas-vapor mixture is hydrolyzed to form a glass soot. The soot leaves flame 16 in a stream 18 and is directed toward starting member 12. The flame hydrolysis method of forming coating 10 is hereinafter described in detail. Starting member 12 is rotated for uniform deposition of the soot.

Figure 2:
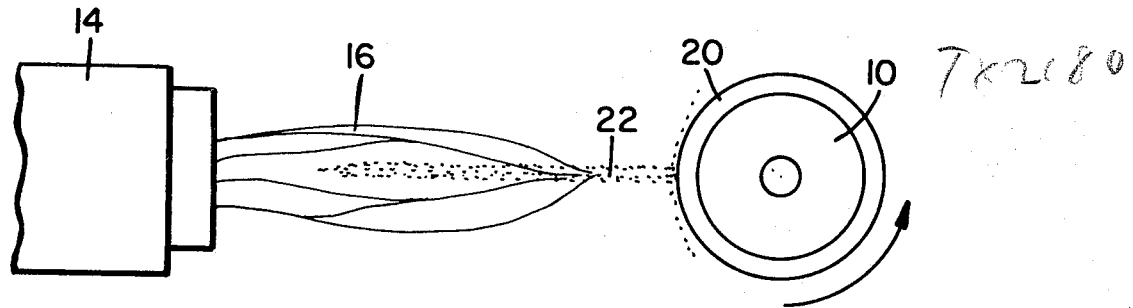
FIG. 2 is an illustration of a means of applying a second coating to the outside peripheral surface of the first coating.

Referring additionally to FIG. 2, a second coating 20 of glass having a predetermined desired index of refraction is similarly applied over the outside peripheral surface of first coating 10 by the same flame hydrolysis method heretofore noted. As illustrated in FIG. 2, the soot leaves flame 16 in a stream 22 and is directed to the outside surface of coating 10. Similarly, coating 10 is rotated for uniform deposition of the second layer of soot. First coating 10 will form the core of the waveguide while second coating 20 will form the cladding. As will be hereinafter described, the index of refraction of a waveguide cladding must be less than the index of refraction of the core for proper operation.

As will be understood, depending on the length of the coatings applied, a plurality of burners similar to burner 14 may be positioned adjacent starting member 12 to provide a uniform distribution of soot along the longitudinal axis of the starting member. Another way for achieving uniform longitudinal distribution of soot is to translate starting member 12 along the longitudinal axis while the coatings are applied.

When coatings 10 and 20 are applied by means of the flame hydrolysis method, the deposited soot must be sintered to provide a uniform and dense material. In accordance with the present invention, coating 10 may be sintered and its exterior surface suitably finished before coating 20 is applied. In such an embodiment, coating 20 would thereafter be sintered before subsequent drawing. In addition, starting member 12 may be removed from the assembly before the second coating is applied or may be removed after both the first and second coatings are applied.

Figure 3:
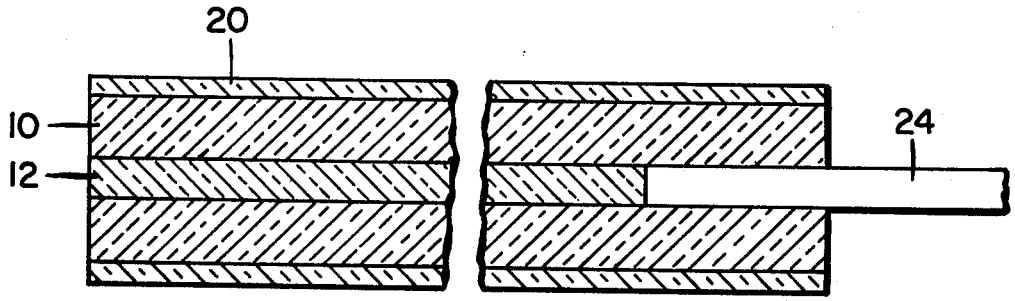
FIG. 3 is a fragmentary cross sectional elevation illustrating a means of removing the starting member.

Referring to FIG. 3, the removal of starting member 12 is illustrated. Starting member 12 is shown being ground out by means of diamond reamer 24, however, any other means for accomplishing this result such, for example, as hydrofluoric acid etching or core drilling are also suitable.

Since glass starting member 12 is ultimately removed, the material of member 12 need only be such as to have a composition and coefficient of expansion compatible with the waveguide cladding and core materials. A suitable material may be a normally produced glass having a composition similar to that of the cladding and core materials although it does not need the high purity of such materials. It may be normally produced glass having ordinary or even an excessive level of impurity or entrapped bubbles that would otherwise render it unsuitable for effective light propagation. The starting member may also be formed of graphite or the like.

The materials of the core and cladding of an optical waveguide should be produced from a glass having minimum light absorption characteristics, and although any optical quality glass may be used, a particularly suitable glass from which to make an optical waveguide is fused silica. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the index of refraction thereof. Therefore, if pure fused silica is used as the cladding glass, fused silica doped with a material to increase the index of refraction can be used as a core glass.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, germanium oxide, and boron oxide. The amount of dopant used should be kept to a minimum for various reasons. First, since additional doping material would cause the index of refraction to increase, the difference between the index of refraction of the cladding glass and the core glass will also increase requiring a decrease in the allowable core diameter of the waveguide to obtain a waveguide having the same operating characteristics, as hereinafter explained. Second, if an excessive amount of doping material is added to the base material, a loss in light transmission will result. Desirably, a small yet precise amount of dopant should be added to the base material for the primary purpose of changing the index of refraction. For the purposes of the present invention, the amount of dopant is preferably maintained below about 15 percent by weight of the total composition.

The desired first and second coatings may be applied by a variety of methods including but not limited to radio frequency sputtering, sintering a coating of soot deposited by the flame hydrolysis process, chemical vapor deposition, depositing a glass frit, and the like. Clearly, the first and second coatings may be applied by either the same or different methods.

A particularly effective method of forming or applying a coating is accomplished by a flame hydrolysis process similar to that described in U.S. Patent No. 2,272,342 issued to J. F. Hyde or U.S. Patent No. 2,326,059 issued to M. E. Nordberg. A modification of the Nordberg process that will provide a titanium doped fused silica coating is as follows. Dry oxygen is bubbled through a tank containing a liquid mixture of approximately 53 percent by weight silicon-tetrachloride, $SiCl_4$, and 47 percent by weight titanium-tetrachloride $TiCl_4$, which mixture is at a temperature of approximately 35° C. $SiCl_4$ and $TiCl_4$ vapors picked up by the oxygen are then passed through a gas-oxygen flame where they are hydrolyzed to form a soot, that is, minute glass particles, with a composition of approximately 95 percent by weight $SiO_2$ and 5 percent by weight $TiO_2$. The glass soot leaves the flame in a steady stream, and is deposited on a rotating starting member. The thickness of the resulting coating is determined by the amount of soot deposited which is primarily controlled by the flow rates and the time allowed for deposition. The soot so applied is then sintered to provide a dense, uniform coating.

A suitable cylindrical member is then formed by grinding out or core drilling the starting member from the composite structure. The outside and inside surfaces of this cylinder are carefully polished and cleansed to remove surface irregularities and contamination which might later cause light scattering. Surface polishing may be achieved by mechanical polishing, fire polishing, laser milling, or the like. A particularly suitable method of smoothing the outside surfaces of the cylinder is accomplished by first mechanically polishing and thereafter flame polishing the mechanically polished surfaces. Hydrofluoric acid washing of the surfaces should be performed before and after all polishing operations to avoid contamination.

Coating 20 of glass is thereafter applied to the cylindrical glass member. The glass of the second coating must have suitable physical and optical properties, such as viscosity, coefficient of expansion, and index of refraction. A particularly effective means of forming coating 20 is to sinter a soot layer of the desired material applied by the modified flame hydrolysis process heretofore described. Since the index of refraction of the cladding and consequently the second coating glass must be lower than that of the core, the glass of the second coating may be of the same base material as the glass of the first coating that will form the core except that it be undoped, or doped to a lesser degree than that of the first coating. If coating 20 is applied by the modified flame hydrolysis process heretofore described, the process parameters would be substantially the same, except that the starting liquid mixture would either not contain titanium-tetrachloride so that the resulting coating would be $SiO_2$ or contain a lesser amount of titanium-tetrachloride so that the resulting coating would be $SiO_2$ doped to a lesser degree than the core.

The necessary characteristics of an optical waveguide to transmit a useable quantity of light is dependent upon light energy not being lost through radiation due to light scattering centers, as well as not being excessively absorbed by the glass material. These centers are often caused by tiny air bubbles or impurities in a waveguide at the core-cladding bond. The method of this invention combines an unusually clean and strong bond, thus eliminating most of such light scattering centers. Furthermore, the present method minimizes the OH radical content.

To limit light propagation along an optical waveguide to preselected modes, whether a single mode or multimode operation is desired, the core diameter, the core index of refraction, and the cladding index of refraction must be coordinated according to the following equation.

$$R = \frac{2\pi a}{\lambda}\sqrt{n_1^2 - n_2^2}$$

where:

$R$ = the cutoff value for the light mode or modes that are desired to be propagated through the fiber ($R$ = 2.405 when light mode $HE_{11}$ is propagated)
$a$ = radius of the core
$\lambda$ = wavelength of transmitted light (sodium light = 5893 A.)
$n_1$ = core index of refraction
$n_2$ = cladding index of refraction An example of the means for determining the coordinated values of the core radius $a$, the core index of refraction $n_1$, and the cladding index of refraction $n_2$ may be as follows. When pure fused silica is chosen to be the cladding glass, the index of refraction of the cladding would be approximately 1.4584. An index of refraction of 1.4584 for fused silica is generally accepted for sodium light having wavelength $\lambda = 5893$ A. Further, if the weight percentage of $SiO_2$ and $TiO_2$ are selected so that the core glass has a resulting index of refraction of 1.466, and the cutoff value is selected such that only the desired light mode or modes will propagate through the fiber, the core diameter necessary to limit light propagation to such desired mode or modes within the optical waveguide can then be determined by solving the above equation for core radius $a$.

It has been found that light absorption properties may be further decreased and light transmission qualities further improved in titanium oxide doped fused silica formed into optical waveguides, if the waveguides are drawn in an oxygen atmosphere and then heat treated in a suitable oxygen, nitrogen, or the like atmosphere. Such heat treatment may consist of heating the waveguide in an oxygen atmosphere to between 500° C. and 1100° C. for not less than 0.5 minute. The length of heat treatment being related to the treatment temperature, that is, lower temperatures require longer heat treatment time while heat treatment at higher temperatures requires a shorter period of time.

After composite structure 26 is formed, it is either maintained at temperature or heated by furnace 28 as illustrated in FIG. 4. After the structure reaches a temperature at which the materials have a low enough viscosity for drawing, it is drawn until the cross sectional size thereof is reduced sufficiently to produce fiber 30. Such a clad fiber thereafter forms the optical waveguide. In FIG. 5 there is illustrated the cross sectional view of the composite structure 26 before it is drawn comprising coatings 10 and 20. FIG. 6 illustrates the cross section of fiber 30 drawn to the desired cross sectional dimensions. The total diameter to core diameter ratio for multimode optical waveguides is preferably in the range of 1001:1000 to 10:1, and for single mode waveguides in the range of 10:1 to 1000:1, although ratios outside of these ranges would also be operable.

A specific example of a multimode waveguide produced by the method of the present invention is as follows. A starting member of fused quartz, approximately ⅛ inch in diameter and about 10 inches long is sealed to a suitable handle. A liquid mixture containing 30.4 percent by weight $TiCl_4$ and 69.6 percent by weight $SiCl_4$ is heated to 35° C. Dry oxygen is bubbled through the liquid mixture and $SiCl_4$ and $TiCl_4$ vapors are picked up by the oxygen. This vapor containing oxygen is then passed through a gas-oxygen flame where the vapors hydrolyze to form a steady stream of approximately 0.1 $\mu$m. sphere-like particles having a composition of 2.5 percent by weight $TiO_2$ and 97.5% by weight $SiO_2$. The stream is directed to the starting member and a soot layer of these particles is built up to about 1.5 inches in diameter. This layer of soot is then sintered in an induction furnace having an oxygen atmosphere at about 1500° C. Thereafter, the outside of the sintered core glass is mechanically polished to an RMS finish of approximately 5 microinches. The fused quartz starting member is then ground out by means of a diamond reamer. The tubular member so formed is rinsed in about a 50% hydrofluoric acid solution, flame polished, and washed again in said acid solution to provide a clean tubular member having approximately ⅝ inch outer diameter. A second coating of 100 percent $SiO_2$ is applied over the tubular member by the same flame hydrolysis method described above except that the liquid mixture does not contain $TiCl_4$. The $SiO_2$ soot is applied until an outside diameter of approximately 1.5 inches is obtained. This structure is then placed in an induction furnace wherein the $SiO_2$ soot is sintered and the resulting composite structure drawn in an oxygen atmosphere at about 2000° C. As the structure is drawn, it decreases in diameter and the central hole collapses. Drawing is continued until the final desired waveguide dimensions are obtained. Typical final waveguide dimensions may be a core diameter of 120 $\mu$m. and a cladding thickness of approximately 40 $\mu$m.

Although the present invention has been described with respect to specific details of certain embodiments thereof, it is not intended that such details be limitations upon the scope of the invention except insofar as set forth in the following claims.

We claim:

1. A method of forming a clad optical fiber comprising the steps of
providing a substantially cylindrical starting member,
applying a first coating of glass to the outside peripheral surface of said member,
applying a second coating of glass having an index of refraction less than that of the glass of said first coating over the outside peripheral surface of said first coating,
removing said cylindrical starting member,
heating the structure so formed to the drawing temperature of the materials thereof, and
drawing the heated structure to reduce the cross-sectional area thereof and to collapse said first coating of glass to form a clad fiber having a solid cross-section, said collapsed first coating forming the core of said fiber and said second coating forming the fiber cladding.

2. The method of claim 1 wherein said first coating of glass is formed by the steps comprising
depositing a layer of glass soot on the outside peripheral surface of said member by flame hydrolysis, and
heating said soot until it sinters.

3. The method of claim 2 wherein said starting member is removed before said second coating is applied.

4. The method of claim 3 wherein said starting member is removed by drilling further comprising the steps of
mechanically polishing the drilled surface, and
flame polishing the mechanically polished surface.

5. The method of claim 4 further comprising the steps of
mechanically polishing the exterior surface of said sintered first coating, and
flame polishing the mechanically polished surface.

6. The method of claim 5 further comprising the step of hydrofluoric acid washing of said surfaces following each polishing step.

7. The method of claim 2 wherein said second coating of glass is formed by the steps comprising
depositing a second layer of glass soot over the outside peripheral surface of said first coating by flame hydrolysis, and
heating said first coating and said second layer of glass soot until said second layer of soot sinters.

8. The method of claim 7 wherein sintering said second layer soot and drawing the structure is accomplished during the same heating step.

9. The method of claim 7 wherein said second coating is fused silica and said first coating is fused silica doped with at least one material selected from the group consisting of titanium oxide, tantalum oxide, tin oxide, niobium oxide, zirconium oxide, aluminum oxide, lanthanum oxide, germanium oxide, and boron oxide.

10. The method of claim 9 wherein said second coating is fused silica and said first coating is fused silica doped with not more than 15 percent by weight of titanium oxide.

11. The method of claim 9 wherein said heated structure is drawn in a substantially oxygen atmosphere.

12. The method of claim 11 further comprising the step of heat treating said clad fiber in an oxygen atmosphere.

13. The method of claim 1 wherein the first or second coating of glass is applied by radio frequency sputtering.

14. The method of claim 1 wherein the first or second coating of glass is applied by chemical vapor deposition.

15. The method of claim 1 wherein the first or second coating of glass is formed by applying a glass frit and thereafter sintering said frit.

16. The method of claim 1 wherein said second coating is fused silica and said first coating is fused silica doped with not more than 15 percent by weight of titanium oxide.

17. The method of claim 1 wherein said first and second coatings of glass are formed by the steps comprising
depositing a first layer of glass soot on the outside peripheral surface of said member by flame hydrolysis,
depositing a second layer of soot over the outside peripheral surface of said first layer by flame hydrolysis, and
heating the resulting assembly until each layer of glass soot sinters, said first sintered layer of soot forming said first coating and said second sintered layer of soot forming said second coating.

References Cited

UNITED STATES PATENTS

| | | | |
|---|---|---|---|
| 2,272,342 | 2/1942 | Hyde | 65—18 X |
| 2,326,059 | 8/1943 | Nordberg | 65—18 X |
| 3,275,428 | 9/1966 | Siegmund | 65—31 X |
| 3,589,878 | 6/1971 | Achener | 65—60 X |
| 3,558,377 | 1/1971 | Tantillo | 65—4 X |
| 3,659,915 | 5/1972 | Maurer | 65—30 X |

ROBERT L. LINDSAY, JR., Primary Examiner

U.S. Cl. X.R.

65—4, 13, 18, 61, Dig. 7; 117—46 FS